United States Patent Office 3,058,354
Patented Oct. 16, 1962

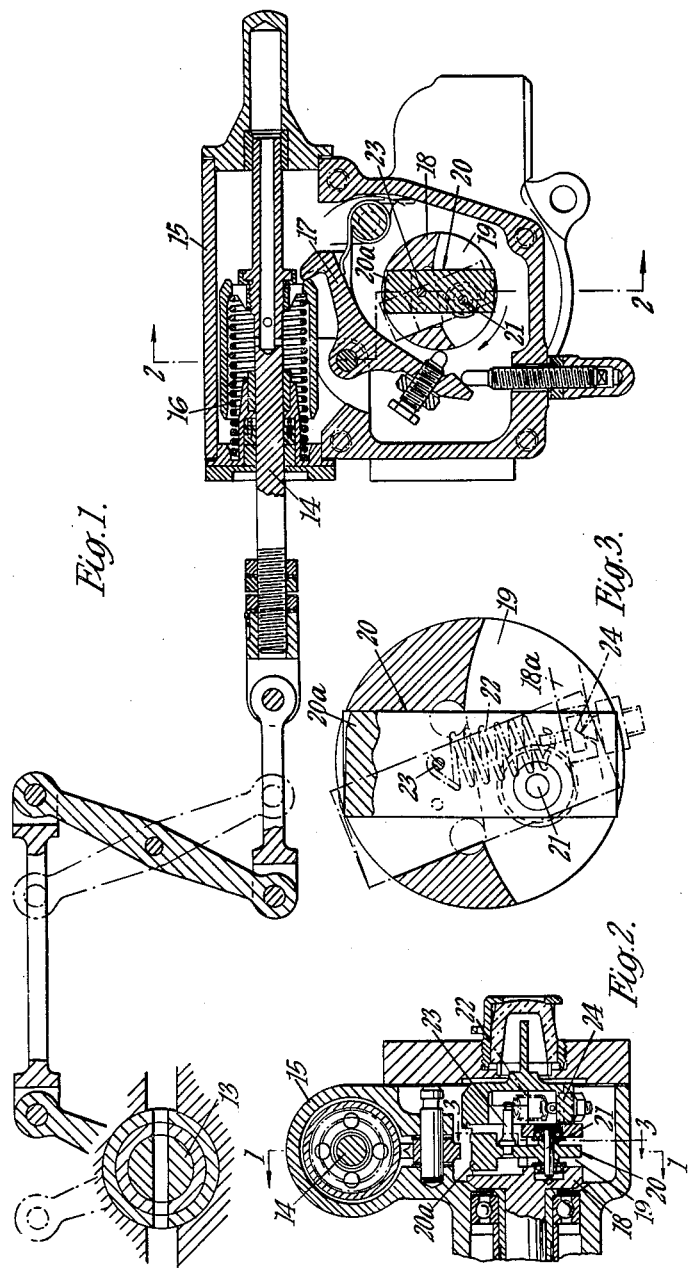

3,058,354
SPEED GOVERNORS
John Ernest Tonkin Shinner, Acocks Green, Birmingham, England, assignor to Joseph Lucas (Industries) Limited, Birmingham, England
Filed June 19, 1961, Ser. No. 117,945
Claims priority, application Great Britain June 27, 1960
1 Claim. (Cl. 73—511)

It is important that an aircraft engine should not be allowed to exceed a predetermined speed, and that in certain conditions it should not be able to exceed a predetermined acceleration lest it destroy itself. In order to meet this requirement it has been proposed to incorporate in the aircraft fuel system a so-called overspeed trip governor for interrupting the supply of fuel to the engine in the event of either the predetermined maximum engine speed being exceeded, or the predetermined acceleration limits being exceeded.

Overspeed trip governors of this kind to which the present invention relates comprise in combination a valve in the engine fuel supplying system, means for loading the valve to a closed position, a catch for retaining the valve in an open position, a rotor adapted to be driven by the engine, and a spring-loaded mass eccentrically pivoted on the rotor in such a position that when a predetermined speed or acceleration of the rotor is exceeded the mass will assume a position to release the catch.

The object of the present invention is to provide a governor of the aforesaid kind in an improved form.

According to the invention in a governor of the kind specified the mass is pivoted upon the rotor about an axis such that, as the mass moves against the action of its spring, the distance of its centre of gravity from the axis of the rotor increases, and the spring interconnecting the mass and rotor is so positioned that its moment remains substantially constant during such movement due to the changes in the leverage through which it acts as the spring force varies.

In the accompanying drawings, FIGURE 1 is a longitudinal section of an example of the invention and is taken on the line 1—1 of FIGURE 2, FIGURE 2 is a section on the line 2—2 of FIGURE 1, and FIGURE 3 is an enlarged section on the line 3—3 of FIGURE 2.

Referring to the drawings, there is provided in the fuel system of an aircraft engine a valve 13 which is operable through a pivotal linkage by an axially movable plunger 14 extending into a hollow body part 15 and loaded by means of a spring 16 towards a position in which the valve is closed. Within the body part 15 is a spring-loaded and pivotal catch 17 for holding the valve in an open position against the action of the spring 16.

Also within the body part 15 is a substantially cylindrical rotor 18 which is adapted to be rotated about a central axis at a speed proportional to the speed of the engine. In the rotor 18 is formed a diametrically extending cavity 19 in which is pivotally mounted a mass 20. The latter is of rectangular shape having a head 20ª at one end constituting the major portion of the weight of the mass, so that the centre of gravity of the mass lies within the head.

The mass 20 is pivoted about a pin 21 passing through it near its lighter end, and is permitted limited angular movement within the cavity 19. The pivot axis of the mass is offset from a line passing through its centre of gravity and the rotor axis, but is at the opposite side of the latter to the centre of gravity. Moreover, the mass is loaded in the same angular direction as the direction of rotation of the rotor 18 by means of a coiled-tension spring 22. One end of the spring 22 is anchored to the mass 20 by means of a pin 23 whose axis lies on or nearly on a line joining its centre of gravity to the rotor axis, whilst the other end of the spring is pivotally connected to the rotor by means of a knife edge 24 engaging a groove in an abutment 18ª formed on the rotor near its outer periphery, the pivot axis of the knife edge extending parallel to that of the mass and being at the opposite side of a line passing through the mass centre of gravity and the rotor axis.

Under the action of the spring 22 the head 20ª of the mass is normally held in contact with one side of the cavity 19, in which position it does not protrude from the rotor. However, at speeds above the predetermined value or in certain combinations of speed and acceleration, centrifugal forces, or the inertia of the mass 20 and centrifugal forces will cause it to move angularly against the action of the spring 22 into a position in which it protrudes from the rotor (as shown in dotted lines in FIGURE 3) to contact and release the catch 17.

As the mass 20 moves against the spring 22 the distance between its centre of gravity and the rotor axis increases, thereby increasing the centrifugal or inertia force moments acting on it. However, the line of action of the spring 22 moves progressively nearer the mass pivot, thereby reducing the leverage through which it acts, as the force of the spring increases due to its extension. By this means the moment of the spring is maintained substantially constant so that as soon as the predetermined speed or combination of speed and acceleration is achieved the head 20ª will move quickly into a position to strike the catch 17, instead of moving progressively towards this position as in previous constructions.

Having thus described my invention what I claim as new and desire to secure by Letters Patent is:

For use in conjunction with a fuel supply system of an aircraft engine having a fuel control valve operatively connected to an axially movable operating plunger which is spring-loaded in the direction for closing the valve, an overspeed trip governor of the kind specified comprising in combination with the spring-loaded plunger, a hollow body part into which said plunger extends, a spring-loaded catch pivotally mounted in said hollow body part, and normally acting on said plunger in the direction for preventing the valve-closing movement thereof, a substantially cylindrical rotor mounted within said hollow body part, and drivable about a central axis at a speed proportional to that of the engine, said rotor being formed with a diametrically extending cavity, a centrifugally operable mass in the form of a substantially rectangular member which is pivotally mounted in said cavity so as to be capable of a limited amount of pivotal movement relative to said cavity, and which has its centre of gravity and pivot axis spaced from, and disposed at opposite sides respectively of, the central axis of said rotor, with said pivot axis offset from a plane containing the central axis of said rotor and the centre of gravity of said mass, so that the distance between said central axis and said centre of gravity increases when said mass is moved by centrifugal force, and a spring interconnecting said mass and said rotor, and urging said mass in the same angular direction as the direction of rotation of said rotor for causing said mass to bear against one side of said cavity, and to be retained wholly within said cavity, said mass being movable by centrifugal force against the action of said spring to a position in which said mass extends from said rotor for acting on, and releasing, said catch, and said spring being positioned so that the moment of the force exerted thereby on said mass remains substantially constant irrespective of the relative positions of the central axis of said rotor and the centre of gravity of said mass.

References Cited in the file of this patent

UNITED STATES PATENTS

| | | |
|---|---|---|
| 646,314 | Rites | Mar. 27, 1900 |
| 2,372,064 | Esarey | Mar. 20, 1945 |
| 2,631,026 | Regna | Mar. 10, 1953 |
| 2,941,538 | Quinby | June 21, 1960 |